Dec. 20, 1960  B. HOWARD  2,965,204
MULTIPLE CLUTCH
Filed Jan. 30, 1957  2 Sheets-Sheet 1
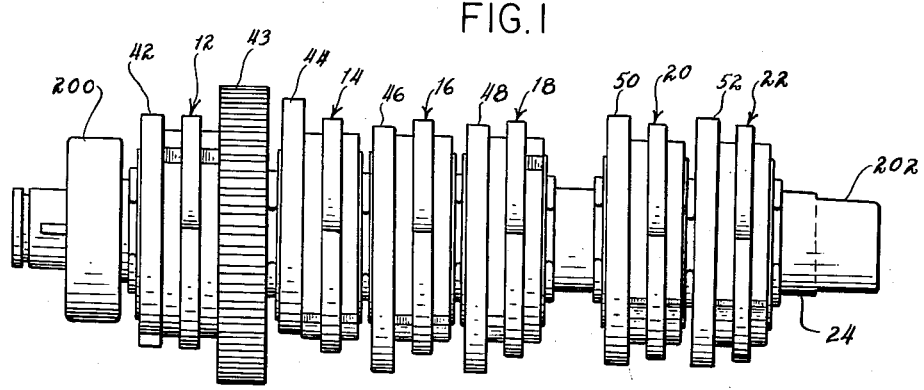
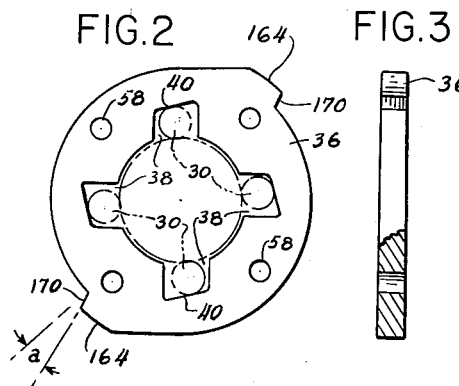 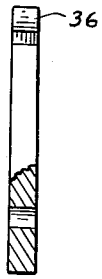 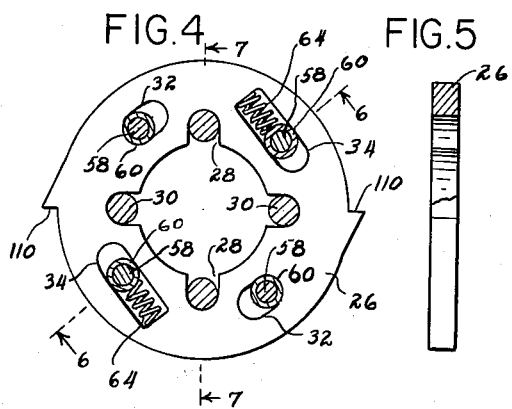 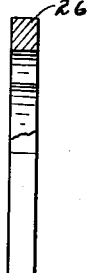
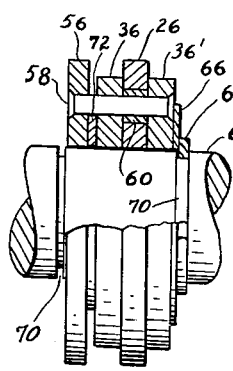 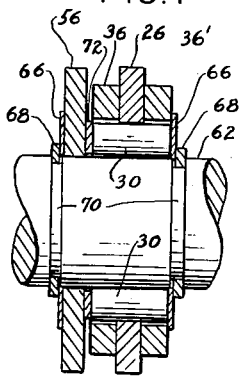 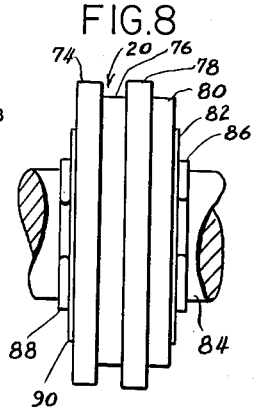 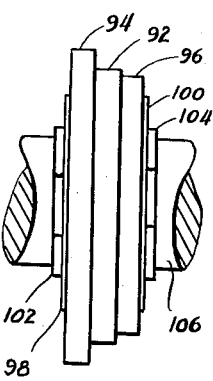
INVENTOR.
BERNARD HOWARD
BY James and Franklin
ATTORNEYS

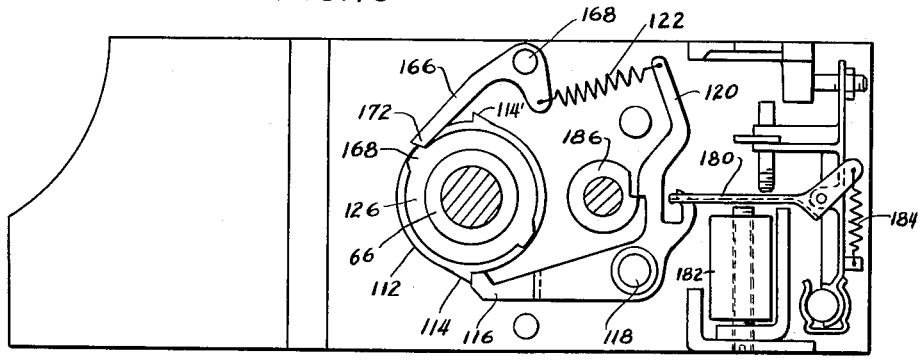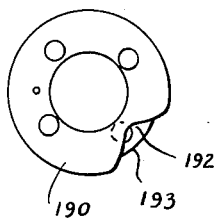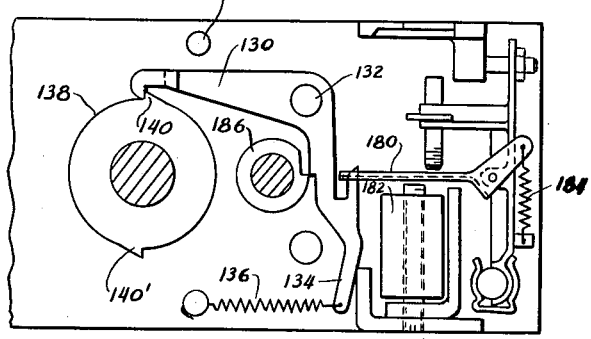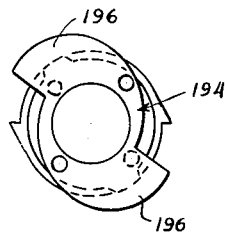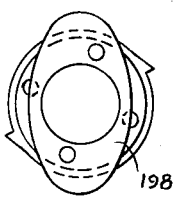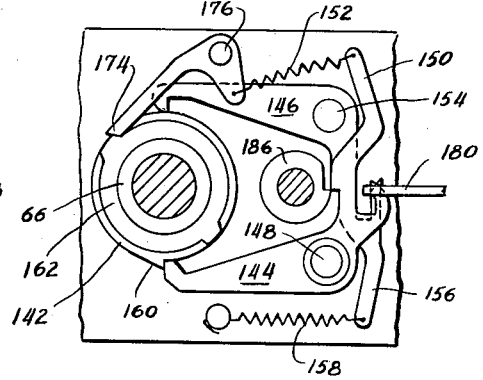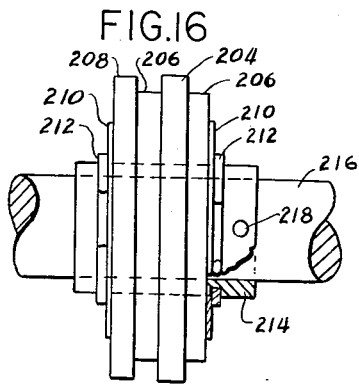

United States Patent Office 2,965,204
Patented Dec. 20, 1960

2,965,204
MULTIPLE CLUTCH

Bernard Howard, Ramsey, N.J., assignor to Teleprinter Corporation, Hackensack, N.J., a corporation of New Jersey Filed Jan. 30, 1957, Ser. No. 637,184

14 Claims. (Cl. 192—48)

This invention relates to clutches, and more particularly to a compact clutch suited for a multiple clutch combination.

The primary object of the present invention is to generally improve clutches. More particular objects are to provide a clutch which is sensitive, sturdy and instantaneous in action. A further object is to prevent chatter when the clutch is disengaged.

Another object is to provide a clutch which is compact in axial direction, and which may be made up mainly of simple flat stampings. Another object is to provide a clutch in which the driving member may be a simple round shaft.

Still another object is to provide a multiple clutch combination comprising an assembly of clutches, all disposed on one simple shaft, and compact in axial direction. A specific object of the invention is to provide a multiple clutch combination which is suited for use in a telegraphic printer of the type disclosed in my Patent 2,769,029, issued October 30, 1956.

To accomplish the foregoing objects, and other more specific objects which will hereinafter appear, my invention resides in the clutch elements and their relation one to another, as are hereinafter more particularly described in the following specification. The specification is accompanied by drawings in which:

Fig. 1 shows a multiple clutch combination embodying features of my invention;

Fig. 2 shows a housing disc forming a part of the driven assembly of the clutch;

Fig. 3 is a partially sectioned edge view of the housing disc shown in Fig. 2;

Fig. 4 shows a cage disc forming a part of the driven assembly, with some related parts as seen in a section taken at the disc;

Fig. 5 is a partially sectioned edge view of the cage disc shown in Fig. 4;

Fig. 6 is a partially sectioned view of an assembled clutch taken approximately in the plane of the line 6—6 of Fig. 4;

Fig. 7 is another section taken approximately in the plane of the line 7—7 of Fig. 4;

Fig. 8 shows a slightly modified clutch, in which the output disc serves also as a retainer for the rollers;

Fig. 9 shows a modified clutch in which the output disc acts also as a housing disc;

Fig. 10 is a view of a clutch with an associated control finger, and an anti-chatter dog;

Fig. 11 shows a modification in which the control finger is in the form of a hook;

Fig. 12 is a modification showing a clutch with two control fingers;

Figs. 13, 14 and 15 show examples of output discs in the form of differently shaped cams; and Fig. 16 illustrates a modified clutch having a hollow driving member for receiving a shaft.

Referring to the drawing, and more particularly to Fig. 1, I there show a multiple clutch assembly comprising a series of clutches generally designated 12, 14, 16, 18, 20 and 22. A relatively long shaft 24 acts as a common inner drive member for all of the clutches. The parts 12, 14 etc. are independently operable driven assemblies, and each consists mainly of flat discs assembled in coaxial relation.

Referring now to Figs. 2–7 of the drawing, one of the flat discs may be called a "cage disc," and is shown at 26 in Figs. 4 and 5. This has internal notches 28 for rollers 30. It also has approximately tangential slots 32 and 34.

The clutch further comprises at least one, and preferably and usually two additional discs shown at 36 in Figs. 2 and 3. These may be termed "housing discs," and they are disposed at the sides of the cage disc 26. The housing disc 36 has internal notches 38 with sloping or wedge surfaces 40 for cooperation with the aforesaid rollers 30.

The complete clutch assembly may further include a driven member which is generically referred to herein as an "output disc." The output disc may be a cam, or gear, or any other suitable member for the particular purpose intended. In Fig. 1 the clutch 12 drives both a cam 42 and a gear 43. The remaining clutches respectively drive cam discs indicated at 44, 46, 48, 50 and 52, for the clutches 14, 16, etc.

In Figs. 6 and 7, the cage disc is shown at 26, and is set between housing discs 36, 36′, while the output disc is indicated at 56.

The assembly of discs is preferably secured together by means of rivets 58. As shown in Fig. 4, these rivets receive tubular spacers 60, and these are located between the housing discs 36, 36′ (Fig. 6). The spacers are received in the aforesaid tangential slots 32, 34 (Fig. 4), and the spacers have a length slightly greater than the thickness of the cage disc 26. Thus, the assembly of discs may be tightly riveted together, yet the cage disc 26 remains oscillatable over a small angle relative to the housing and output discs. The angle is determined by the action of the clutch rollers 30, and the slots 32, 34 (Fig. 4) and notches 38 (Fig. 2) are made long enough to insure room for action of the clutch rollers.

The clutch is further provided with resilient means to relatively move the cage 26 and housing 36 in that direction which causes the rollers 30 to engage the driving shaft 62. More specifically, I provide small compression springs 64 (Fig. 4) which are received in the slots 34, and which bear against the spacers 60, and through them against the rivets 58. The slots 34 are made longer than the slots 32 in order to accommodate the springs 64.

The driven assembly may be held against axial movement on the shaft. For this purpose, I employ retainers 66 (Fig. 7) and snap rings 68, the latter being received in mating grooves 70 in shaft 62. Apart from the grooves 70, the shaft 62 may be a simple cylindrical shaft of uniform diameter throughout the length of the assembly of clutches. The retainers 66 are preferably thin flat washers. Their outside diameter is preferably sufficient to enclose the ends of the rollers 30. In the specific arrangement shown in Figs. 6 and 7, an extra retainer 72 is inserted between the housing disc 36 and the output disc. This retainer 72 bears against one end of the rollers 30, while the external retainer 66 bears against the opposite end of the rollers.

However, it may be explained that the retainer 72 is optional. It has some advantage in special cases, as for example, if the output disc 56 is a cam which is reduced at some points to a radius less than that of the housing disc 36, and some clearance is wanted on each side of the cam.

Fig. 8 shows a modified clutch assembly in which an output disc 74 bears directly against the side of the housing disc 76. There is also a cage disc 78, and another housing disc 80. The four discs are riveted together in face to face relation, with spacers (like 60 in Fig. 6) to keep the cage disc movable. The clutch rollers are slightly shorter than the overall thickness of the discs 76 and 80 with the spacers therebetween, and the rollers are held against axial movement by the retainer 82 at one end, and the output disc 74 at the other end. The clutch assembly is located on the shaft 84 by means of a snap ring 86 bearing against retainer 82, and a snap ring 88 bearing against a retainer 90, it being understood that the snap rings are received in mating grooves in the shaft 84 (as previously shown in Figs. 6 and 7). In all cases the snap rings are conventional open or partial or gapped rings which may be forced radially onto the shaft at the mating groove.

It is not essential that the output disc be a separate disc from the housing discs, and Fig. 9 shows a modified clutch in which the cage disc 92 with its springs and rollers, etc. is enclosed on opposite sides by an output disc 94 and a housing disc 96. The output disc 94 has notches with sloping wedge surfaces for the rollers, as shown at 38, 40 in Fig. 2, and thus acts as a housing disc as well as an output disc. In such case, the rollers extend through the three-disc assembly, and are held against axial movement by retainers 98 and 100, which in turn are located against axial movement by snap rings 102 and 104. The latter are received in mating grooves in the shaft 106.

Reverting now to Fig. 4, the cage disc 26 has one or more teeth 110 facing in the direction of rotation of the clutch, for cooperation with a clutch control finger. By simultaneous observation of Figs. 2 and 4, it will be seen that if the cage disc 26 is held against rotation by a clutch control finger bearing against tooth 110, the rollers 30 are moved to the high or "release" ends of the sloping wedge surfaces 40. This is so because the notches 28 in the cage disc 26 control the location of the rollers 30, and when the cage disc is moved slightly in clockwise direction, relative to the rivets 58 and housing discs 36, then the rollers 30 are similarly moved slightly clockwise relative to the housing discs, which puts them in their disengaged or released position.

When, however, the clutch control finger is moved away from the tooth 110, the natural tendency of the rollers 30 is to move counter clockwise with the driving shaft into engaged position against the wedge surfaces 40. Moreover, instantaneous clutch engagement is here doubly insured by the provision of the resilient means 64 which promptly move the cage 26 in counter clockwise direction relative to the rivets 58 (Fig. 4) and housing discs 36 (Fig. 2), and thus cause instantaneous engagement of the rollers 30 against the wedge surfaces 40.

Referring now to Fig. 10 of the drawing, the cage disc 112 has a tooth 114 intercepted by a clutch control finger 116. This is an angle lever which is pivoted at 118, and the arm 120 which is normally pulled by a spring 122, thus urging the finger 116 to clutch releasing position. The control of the angle lever may be obtained in any desired fashion.

If the cage has one tooth 114, and if the finger 116 is returned to stop position promptly after being moved out, the clutch will function as a single revolution clutch. If the cage has two teeth 114 and 114' which are 180° apart as here shown, the clutch will function as a one-half revolution clutch. With three teeth, it could be a one-third revolution clutch. If the cage has one tooth, and the control finger 116 is held out for a substantial time, the shaft 124 will drive the housing disc 126 and other parts of the driven assembly for a corresponding number of whole revolutions. If there are two teeth, as shown, the clutch will be stopped to the nearest one-half revolution. If a large number of teeth are provided, the clutch is stopped as soon as the control finger moves in.

The arrangement shown in Fig. 11 is generally similar to that shown in Fig. 10, except that the clutch control finger 130 is in the form of a hook which acts in tension, instead of being in the form of a pusher which acts in compression, as shown in Fig. 10. As before, the finger 130 may form one arm of an angle lever pivoted at 132, the other arm 134 of which is pulled by a spring 136. The movement of the angle lever is controlled by appropriate mechanism. As before, if the cage disc 138 has a single tooth 140, the clutch will operate as a single revolution clutch, or if the finger 130 is held out, it will operate to the nearest whole number of revolutions. If the cage disc has two oppositely located teeth 140 and 140', it will function as a one-half revolution clutch, or if the finger is held out, it will function to the nearest half revolution, and so on.

Fig. 12 is largely a combination of Figs. 10 and 11, in that the cage disc 142 has one tooth 160 and is acted on by two control fingers 144 and 146. The finger 144 is a pusher finger, forming part of an angle lever pivoted at 148, and having an arm 150 which is pulled by a spring 152. The finger 146 is a hook or tension finger, forming part of an angle lever pivoted at 154, and having an arm 156 which is pulled by a spring 158. With this arrangement, the clutch may be operated as a one-half revolution clutch, while using only one tooth 160 on cage disc 142. It may be mentioned that the control mechanism for the fingers 144 and 146 is such that one remains engaged when the other is disengaged. Thus the clutch is released for at most one-half revolution at one time. Most of the time both fingers are engaged, under control of a sequence cam 186.

As so far described, the clutch will function satisfactorily, but may be subject to some slight vibration or chatter caused by relative oscillation of the housing discs relative to the cage disc. This may have the disadvantage of noise, and of increasing the wear of the parts. To overcome this, the clutch is preferably provided with an anti-chatter dog which operates against the driven assembly, and more specifically against a housing disc. Reverting to Fig. 2, it will be seen that the housing disc 36 has teeth 164. These teeth face in a direction opposite to that of the clutch control teeth 110 of the cage disc 26 shown in Fig. 4. If the clutch is a single revolution clutch, it requires only one tooth 164. If it is a one-half revolution clutch, it should have two teeth 164 in diametrical relation as shown in Fig. 2, assuming that they cooperate with only one finger.

Referring now to Fig. 10, I provide an anti-chatter dog or back stop 166 pivoted at 168, and urged against the periphery of housing disc 126 by pull spring 122. The tooth 168 on housing disc 126 engages the back stop or anti-chatter dog 166 at the proper timing or orientation to permit the clutch control tooth 114 on cage 112 to be in engagement with the clutch control finger 116. Differently expressed, when cage disc 112 is arrested by finger 116, and when it is in counter clockwise relation (with the rivets at the leading ends of slots 32 at Fig. 4), the back stop 166 drops behind tooth 168, and holds the parts in that desired relation. The rollers 30 are held in disengaged position. Vibration (of the rivets relative to the slots in Fig. 4) and clutch chatter are effectively prevented.

To avoid the need for precision in the relation of the back stop dog 166 and the tooth 168, their abutting surfaces are preferably sloped. Thus, in Fig. 2, it will be seen that the surfaces 170 of teeth 164 have an angle "a" instead of being radial, and in the present case this angle is 20°. Similarly, referring to Fig. 10, the end or tip 172 of the dog 166 has a mating angle of 20°. With this arrangement, the parts may be designed so that the dog partially instead of fully engages the tooth. Any slight error will be compensated by a somewhat lesser or greater engagement of the tooth. Moreover, future wear is compensated by a gradually increasing engagement of the tooth.

It will be understood that it is sufficient to slope either the tooth, or the end of the dog, and that it is not essential to matingly slope both, although that is the preferred arrangement because it minimizes wear.

In Fig. 11, the housing disc and back stop dog are not shown, but it will be understood that they are provided exactly as shown in Fig. 10, with the dog pivoted at 168, as before. Only the outline of the cage disc is shown.

In Fig. 12, the housing disc 162 has two diametrically related teeth which are acted on by a back stop 174 pivoted at 176, as previously described. In this case, the cage disc 142 has only one tooth 160, but is acted on by two fingers 144 and 146, and therefore the housing disc 162 is provided with two teeth. One might alternatively provide two back stop dogs located 180° apart, and operating on a single tooth.

Both housing discs are made alike, for simplicity of manufacture, and therefore both have teeth. A single back stop working against one of the housing discs is sufficient, although two collateral or one broad back stop could be used against both discs.

It will also be understood that in the case of a single revolution clutch, only one back stop tooth is needed; with a one-third revolution clutch, three back stop teeth are needed, and so on. For a clutch which stops as soon as the control finger moves in, both the cage disc and the housing disc may become ratchet wheels, each provided with a large number of teeth, but with the teeth facing in opposite direction.

The mechanism for controlling the clutch fingers shown in Figs. 10, 11 and 12 forms no part of the present invention, and need not be described in detail. The clutches are here used for a telegraphic printer apparatus of a type shown in my Patent No. 2,769,029, issued October 30, 1956, and in that patent, the angle levers are controlled directly by magnets. In the present mechanism, the angle levers are controlled by an intermediate flipper 180 which is controlled by a magnet 182 and a pull spring 184. These cooperate with a sequence control cam 186. The mechanism using a flipper 180 for indirect magnetic control is described in greater detail in my copending application Serial No. 652,179 filed April 11, 1957, now Patent No. 2,918,528. In practice, the flipper 180 rests in either extreme position, and only momentarily during transition from one side to the other does it assume the mid position shown in Figs. 10, 11, and 12. In that mid position, the flipper momentarily holds both fingers against movement to clutch releasing position. This has the advantage of preventing any possibility of both fingers being released during the movement of the flipper from one side to the other.

In the telegraphic printer apparatus, the clutches control various kinds of output discs. Most of the output discs are cams, and one such cam is shown in Fig. 13, the cam periphery 190 having a drop at 192. In this case, three of the rivets pass through the cam. The fourth rivet is shorter and terminates at the housing disc 193 before reaching the output disc.

In Fig. 14, the output disc is a cam 194 which has two rises 196. In this case only two rivets pass through the cam. The other two rivets stop short of the cam. In this case the four rivets could pass through the cam if desired.

Similar remark applies to Fig. 15, in which the cam 198 is held by two rivets. The other two rivets necessarily stop short of the cam in this case.

The output disc need not be a cam, and in Fig. 1, the output disc 43 is a gear. This may be held by two or four rivets, as desired. The disc 43 may have the same thickness as all the other discs, or if it be desired to prolong the life of the gear teeth, the thickness of the disc may be increased as here shown.

The clutch may have more than one output disc, and in Fig. 1, the clutch 12 carries not only the gear 43 but another output disc 42, there being five main discs in all. The output disc 42 is a cam.

Another thing which will be observed in Fig. 1 is that the clutches may be disposed very close to one another on the shaft 24, and a single spring snap ring may be used between the retainers of two adjacent clutches. In this case a single snap ring is employed between the clutches 14 and 16, and again between clutches 16 and 18, and again between the clutches 20 and 22. The part 200 is a ball bearing or similar anti-friction bearing, mounted on shaft 24. In the telegraph printer referred to, there is an additional shaft carrying additional clutches, the two shafts being connected end to end at a bifurcation or coupling 202. The shaft is divided into two shafts merely for convenience in servicing the machine.

As so far described, the driving member has been a solid shaft. This is convenient, and constitutes an important advantage of the present clutch, but it is not essential, and the driving member may instead be a bushing or hollow shaft which itself receives and is secured to another shaft. This is shown in Fig. 16, in which the driven assembly is like any of those previously described. In the present case, it comprises a cage disc 204, housing discs 206, and an output disc 208, riveted together and held against axial movement by retainers 210 and snap rings 212. The latter are snapped into mating grooves in a hollow or tubular shaft 214, which in turn receives a shaft 216, to which it is secured by a suitable drive pin 218, or one or more set screws or like means. With this arrangement, the clutch may be made and sold as an assembled intact unit for ready mounting on a shaft 216 of appropriate diameter.

To assemble the clutch, a sub-assembly is first made of the main discs. To do this, a housing disc is provided with four rivets. Spacers are slid over the rivets, and the cage disc is next slid over the rivets and spacers. The compression springs are then inserted in the tangential slots of the cage disc, following which the second housing disc is slid over the rivets. If some of the rivets are short rivets (as in Figs. 13, 14 and 15), they are now headed, following which the output disc is slid over the remaining unheaded or longer rivets, which then too are headed. If an extra retainer 72 is used, as in Figs. 6 and 7, this is put in place before the output disc. The resulting sub-assembly of discs is made without the clutch rollers.

To complete the clutch assembly, the shaft is provided with a snap ring and retainer at one end; the driven or disc assembly is slid over the shaft; the clutch rollers are dropped into position in a direction parallel to the shaft; following which the other retainer and snap ring are added to hold the rollers in position, and to complete the assembly.

In Figs. 10, 11 and 12, the sequence cam 186 has a single drop. In my aforesaid Patent 2,769,029, the sequence cam has two drops 180° apart. The difference is that in said patent, the gear ratio between the cam shaft and the sequence shaft is one-to-one, whereas in the present apparatus the ratio has been changed to one-to-two, that is, the sequence cam 186 turns twice for each revolution of the main cam shaft, and thus the single drop in cam 186 is equivalent to the two diametrically opposed drops shown in the patent. Differently expressed, the single drop in cam 186 corresponds to a half revolution of the clutch because of their two-to-one gear ratio.

It is believed that the construction, assembly and operation of my improved clutch and multiple combination clutch, as well as the advantages thereof, will be apparent from the foregoing detailed description. It will be understood that in minimum form, the clutch will operate with a single clutch roller, and in such case, the cage disc need have only a single notch, and the housing disc need have only a single wedge surface. Similarly, the cage disc might have only a single compression spring received in a single slot. Of course, a symmetrical arrangement with multiple rollers, springs and rivets is preferred.

It will be apparent that while I have shown and described the invention in several preferred forms, changes may be made in the structures shown, without departing from the scope of the invention as sought to be defined in the following claims. In the claims, the reference to rollers, tangential slots, springs, notches for rollers, and so on, is in the plural, for convenience, but this is not intended to exclude a clutch having a single clutch roller or a single compression spring, etc.

I claim:

1. A clutch comprising an inner driving member and an outer driven assembly, said assembly comprising flat discs assembled in coaxial relation, one of said discs being a cage disc having internal notches for rollers and having approximately tangential slots, clutch rollers in said notches, housing discs on each side of said cage disc, said housing discs having internal notches with wedge surfaces for cooperating with said rollers, means securing said housing discs in spaced relation, said means extending in the direction of the axis of the driving member and being received in the aforesaid tangential slots, resilient means housed in said tangential slots and bearing against said securing means to relatively move the cage and housing in that direction which causes the rollers to engage, said cage having one or more teeth facing in the direction of rotation for cooperation with a clutch control finger.

2. A clutch comprising an inner driving member and an outer driven assembly, said assembly comprising flat discs assembled in coaxial relation, one of said discs being a cage disc having internal notches for rollers and having approximately tangential slots, clutch rollers in said notches, housing discs on each side of said cage disc, said housing discs having internal notches with wedge surfaces for cooperating with said rollers, means securing said housing discs in spaced relation, said means extending in the direction of the axis of the driving member and being received in the aforesaid tangential slots, compression springs housed in said slots and bearing against said means to relatively move the cage and housing in that direction which causes the rollers to engage, said cage having one or more teeth facing in the direction of rotation for cooperation with a clutch control finger, and one of said housing discs having one or more oppositely facing teeth for cooperation with a back stop dog.

3. A clutch comprising an inner driving member and an outer driven assembly, said assembly comprising flat discs assembled in coaxial relation, one of said discs being a cage disc having internal notches for rollers and having approximately tangential slots, clutch rollers in said notches, housing discs on each side of said cage disc, said housing discs having internal notches with wedge surfaces for cooperating with said rollers, means securing said housing discs in spaced relation, said means extending in the direction of the axis of the driving member and being received in the aforesaid tangential slots, compression springs housed in said slots and bearing against said means to relatively move the cage and housing in that direction which causes the rollers to engage, retainers for the rollers in the form of thin flat washers at each side of the driven assembly, and resilient snap rings outside said retainers received in grooves in said driving member in order to hold the retainers and the driven assembly against axial movement, said cage having one or more teeth facing in the direction of rotation for cooperation with a clutch control finger.

4. A clutch comprising an inner driving member and an outer driven assembly, said assembly comprising flat discs assembled in coaxial relation, one of said discs being a cage disc having internal notches for rollers and having approximately tangential slots, clutch rollers in said notches, a housing disc on one side of said cage disc, said housing disc having internal notches with wedge surfaces for cooperating with said rollers, an output disc, means securing said discs together, said means extending in the direction of the axis of the driving member and being received in the aforesaid tangential slots, resilient means housed in said tangential slots and bearing against said securing means to relatively move the cage and housing in that direction which causes the rollers to engage, said cage having one or more teeth facing in the direction of rotation for cooperation with a clutch control finger.

5. A clutch comprising an inner driving member and an outer driven assembly, said assembly comprising flat discs assembled in coaxial relation, one of said discs being a cage disc having internal notches for rollers and having approximately tangential slots, clutch rollers in said notches, a housing disc on one side of said cage disc, said housing disc having internal notches with wedge surfaces for cooperating with said rollers, an output disc, means securing said discs together, said means extending in the direction of the axis of the driving member and being received in the aforesaid tangential slots, compression springs housed in said slots and bearing against said means to relatively move the cage and housing in that direction which causes the rollers to engage, said cage having one or more teeth facing in the direction of rotation for cooperation with a clutch control finger, and said housing disc having one or more oppositely facing teeth for cooperation with a back stop dog.

6. A clutch comprising an inner driving member and an outer driven assembly, said assembly comprising flat discs assembled in coaxial relation, one of said discs being a cage disc having internal notches for rollers and having approximately tangential slots, clutch rollers in said notches, a housing disc on one side of said cage disc, said housing disc having internal notches with wedge surfaces for cooperating with said rollers, an output disc, means securing said discs together, said means extending in the direction of the axis of the driving member and being received in the aforesaid tangential slots, compression springs housed in said slots and bearing against said means to relatively move the cage and housing in that direction which causes the rollers to engage, retainers for the rollers in the form of thin flat washers at each side of the driven assembly, and resilient snap rings outside said retainers received in grooves in said driving member in order to hold the retainers and the driven assembly against axial movement, said cage having one or more teeth facing in the direction of rotation for cooperation with a clutch control finger.

7. A clutch comprising an inner driving member and an outer driven assembly, said assembly comprising flat discs assembled in coaxial relation, one of said discs being a cage disc having internal notches for rollers and having approximately tangential slots, clutch rollers in said notches, housing discs on each side of said cage disc, said housing discs having internal notches with wedge surfaces for cooperating with said rollers, an output disc, means securing said discs together, said means extending in the direction of the axis of the driving member and being received in the aforesaid tangential slots, resilient means housed in said tangential slots and bearing against said securing means to relatively move the cage and housing in that direction which causes the rollers to engage, said cage having one or more teeth facing in the direction of rotation for cooperation with a clutch control finger.

8. A clutch comprising an inner driving member and an outer driven assembly, said assembly comprising flat discs assembled in coaxial relation, one of said discs being a cage disc having internal notches for rollers and having approximately tangential slots, clutch rollers in said notches, housing discs on each side of said cage disc, said housing discs having internal notches with wedge surfaces for cooperating with said rollers, an output disc, means securing said discs together, said means extending in the direction of the axis of the driving member and being received in the aforesaid tangential slots, compression springs housed in said slots and bearing against said means to relatively move the cage and housing in that direction which causes the rollers to engage, said cage having one or more teeth facing in the direction of rotation for cooperation with a clutch control finger, and one of said housing discs having one or more oppositely facing teeth for cooperation with a back stop dog.

9. A clutch comprising an inner driving member and an outer driven assembly, said assembly comprising flat discs assembled in coaxial relation, one of said discs being a cage disc having internal notches for rollers and having approximately tangential slots, clutch rollers in said notches, housing discs on each side of said cage disc, said housing discs having internal notches with wedge surfaces for cooperating with said rollers, an output disc, means securing said discs together, said means extending in the direction of the axis of the driving member and being received in the aforesaid tangential slots, compression springs housed in said slots and bearing against said means to relatively move the cage and housing in that direction which causes the rollers to engage, retainers for the rollers in the form of thin flat washers at each side of the driven assembly, and resilient snap rings outside said retainers received in grooves in said driving member in order to hold the retainers and the driven assembly against axial movement, said cage having one or more teeth facing in the direction of rotation for cooperation with a clutch control finger.

10. A multiple clutch combination comprising a series of clutches arranged coaxially in compact relation, said combination comprising a relatively long shaft acting as an inner drive member for all of said clutches, a series of independently operable outer driven assemblies, each assembly comprising flat discs assembled in coaxial relation, one of said discs being a cage disc having internal notches for rollers and having approximately tangential slots, clutch rollers in said notches for directly engaging said long shaft, housing discs on each side of said cage disc, said housing discs having internal notches with wedge surfaces for cooperating with said rollers, means securing said housing discs together in spaced relation, said means extending in the direction of the axis of the driving member and being received in the aforesaid tangential slots, resilient means housed in said tangential slots and bearing against said securing means to relatively move the cage and housing in that direction which causes the rollers to engage, said cage having one or more teeth facing in the direction of rotation for cooperation with a clutch control finger.

11. A multiple clutch combination comprising a series of clutches arranged coaxially in compact relation, said combination comprising a relatively long shaft acting as an inner drive member for all of said clutches, a series of independently operable outer driven assemblies, each assembly comprising flat discs assembled in coaxial relation, one of said discs being a cage disc having internal notches for rollers and having approximately tangential slots, clutch rollers in said notches for directly engaging said long shaft, housing discs on each side of said cage disc, said housing discs having internal notches with wedge surfaces for cooperating with said rollers, means securing said housing discs together in spaced relation, said means extending in the direction of the axis of the driving member and being received in the aforesaid tangential slots, compression springs housed in said slots and bearing against said means to relatively move the cage and housing in that direction which causes the rollers to engage, said cage having one or more teeth facing in the direction of rotation for cooperation with a clutch control finger, and one of said housing discs having one or more oppositely facing teeth for cooperation with a back stop dog.

12. A multiple clutch combination comprising a series of clutches arranged coaxially in compact relation, said combination comprising a relatively long shaft acting as an inner drive member for all of said clutches, a series of independently operable outer driven assemblies, each assembly comprising flat discs assembled in coaxial relation, one of said discs being a cage disc having internal notches for rollers and having approximately tangential slots, clutch rollers in said notches for directly engaging said long shaft, housing discs on each side of said cage disc, said housing discs having internal notches with wedge surfaces for cooperating with said rollers, means securing said housing discs together, said means extending in the direction of the axis of the driving member and being received in the aforesaid tangential slots, resilient means housed in said tangential slots and bearing against securing means to relatively move the cage and housing in that direction which causes the rollers to engage, retainers for the rollers in the form of thin flat washers at each side of the driven assembly, and resilient snap rings outside said retainers received in grooves in said driving member in order to hold the retainers and the driven assembly against axial movement, said cage having one or more teeth facing in the direction of rotation for cooperation with a clutch control finger.

13. A multiple clutch combination comprising a series of clutches arranged coaxially in compact relation, said combination comprising a relatively long shaft acting as an inner drive member for all of said clutches, a series of independently operable outer driven assemblies, each assembly comprising flat discs assembled in coaxial relation, one of said discs being a cage disc having internal notches for rollers and having approximately tangential slots, clutch rollers in said notches for directly engaging said long shaft, a housing disc on one side of said cage disc, said housing disc having internal notches with wedge surfaces for cooperating with said rollers, an output disc, means securing said discs together, said means extending in the direction of the axis of the driving member and being received in the aforesaid tangential slots, resilient means housed in said tangential slots and bearing against said securing means to relatively move the cage and housing in that direction which causes the rollers to engage, retainers for the rollers in the form of thin flat washers at each side of the driven assembly, and resilient snap rings outside said retainers received in grooves in said driving member in order to hold the retainers and the driven assembly against axial movement, said cage having one or more teeth facing in the direction of rotation for cooperation with a clutch control finger.

14. A multiple clutch combination comprising a series of clutches arranged coaxially in compact relation, said combination comprising a relatively long shaft acting as an inner drive member for all of said clutches, a series of independently operable outer driven assemblies, each assembly comprising flat discs assembled in coaxial relation, one of said discs being a cage disc having internal notches for rollers and having approximately tangential slots, clutch rollers in said notches for directly engaging said long shaft, housing discs on each side of said cage disc, said housing discs having internal notches with wedge surfaces for cooperating with said rollers, an output disc, means securing said discs together, said means extending in the direction of the axis of the driving member and being received in the aforesaid tangential slots, resilient means housed in said tangential slots and bearing against said securing means to relatively move the cage and housing in that direction which causes the rollers to engage, said cage having one or more teeth facing in the direction of rotation for cooperation with a clutch control finger, and one of said housing discs having one or more oppositely facing teeth for cooperation with a back stop dog.

References Cited in the file of this patent
UNITED STATES PATENTS

| Number | Name | Date |
|---|---|---|
| 260,394 | Horton | July 4, 1882 |
| 906,181 | Zeitz | Dec. 8, 1908 |
| 1,429,404 | Card | Sept. 19, 1922 |
| 2,371,653 | Schuckers | Mar. 20, 1945 |
| 2,504,481 | Zingheim | Apr. 18, 1950 |
| 2,691,896 | Stageberg | Oct. 19, 1954 |
| 2,699,239 | Klonoski | Jan. 11, 1955 |